(No Model.)　　　　　　　　　　　　　5 Sheets—Sheet 1.
J. B. ARCHER.
PROCESS OF MANUFACTURING GAS.

No. 491,066.　　　　　　　　　　　Patented Feb. 7, 1893.

Witnesses;　　　　　　　　　　　　Inventor;

(No Model.) 5 Sheets—Sheet 2.
J. B. ARCHER.
PROCESS OF MANUFACTURING GAS.

No. 491,066. Patented Feb. 7, 1893.

Witnesses:
Percy C. Bowen
John C. Wilson

Inventor:
John B. Archer
By Whitman & Wilkinson
Attorneys.

(No Model.) 5 Sheets—Sheet 3.

J. B. ARCHER.
PROCESS OF MANUFACTURING GAS.

No. 491,066. Patented Feb. 7, 1893.

Witnesses;

Inventor;
John B. Archer
By Whitman & Wilkinson
Attorneys.

(No Model.) 5 Sheets—Sheet 4.

J. B. ARCHER.
PROCESS OF MANUFACTURING GAS.

No. 491,066. Patented Feb. 7, 1893.

Fig. 4.

Witnesses;
Percy C. Bowen
John C. Toelson

Inventor;
John B. Archer
By Whitman & Wilkinson
Attorneys.

(No Model.) 5 Sheets—Sheet 5.
J. B. ARCHER.
PROCESS OF MANUFACTURING GAS.
No. 491,066. Patented Feb. 7, 1893.
*Fig. 5.*     *Fig. 5.ª*
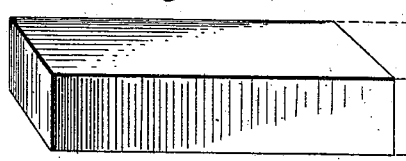 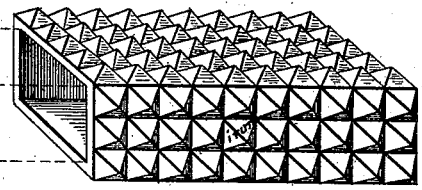
*Fig. 6.*     *Fig. 6.ª*
 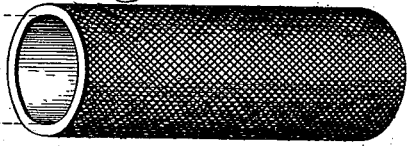
*Fig. 7.*     *Fig. 7.ª*
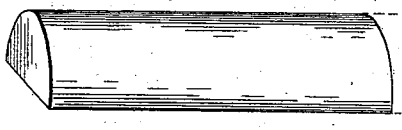 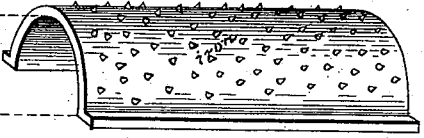
*Fig. 8.*     *Fig. 8.ª*
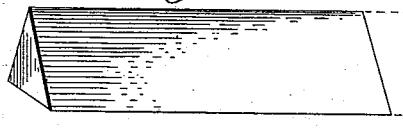 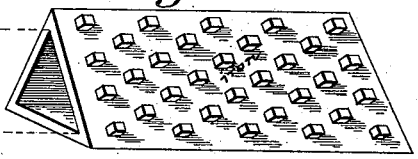
*Fig. 9.*     *Fig. 9.ª*
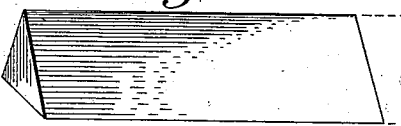 
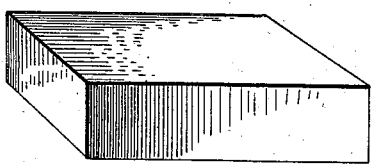
*Fig. 10.*
Witnesses;
Percy C. Bowen
John C. Wilson
Inventor;
John B. Archer
By Whitman & Wilkinson
Attorneys.

UNITED STATES PATENT OFFICE.

JOHN B. ARCHER, OF WASHINGTON, DISTRICT OF COLUMBIA.

PROCESS OF MANUFACTURING GAS.

SPECIFICATION forming part of Letters Patent No. 491,066, dated February 7, 1893.

Application filed March 22, 1892. Serial No. 425,900. (No specimens.)

*To all whom it may concern:*

Be it known that I, JOHN B. ARCHER, a citizen of the United States, residing at Washington, in the District of Columbia, have invented certain new and useful Improvements in Processes of Manufacturing Gas; and I do hereby declare the following to be a full, clear, and exact description of the invention, such as will enable others skilled in the art to which it appertains to make and use the same.

My invention relates to the manufacture of gas according to that class of processes in which the inter-decomposition of oil and water is effected, and in which the gaseous products in a measure result from the interaction of steam and carbon.

Figure 1:
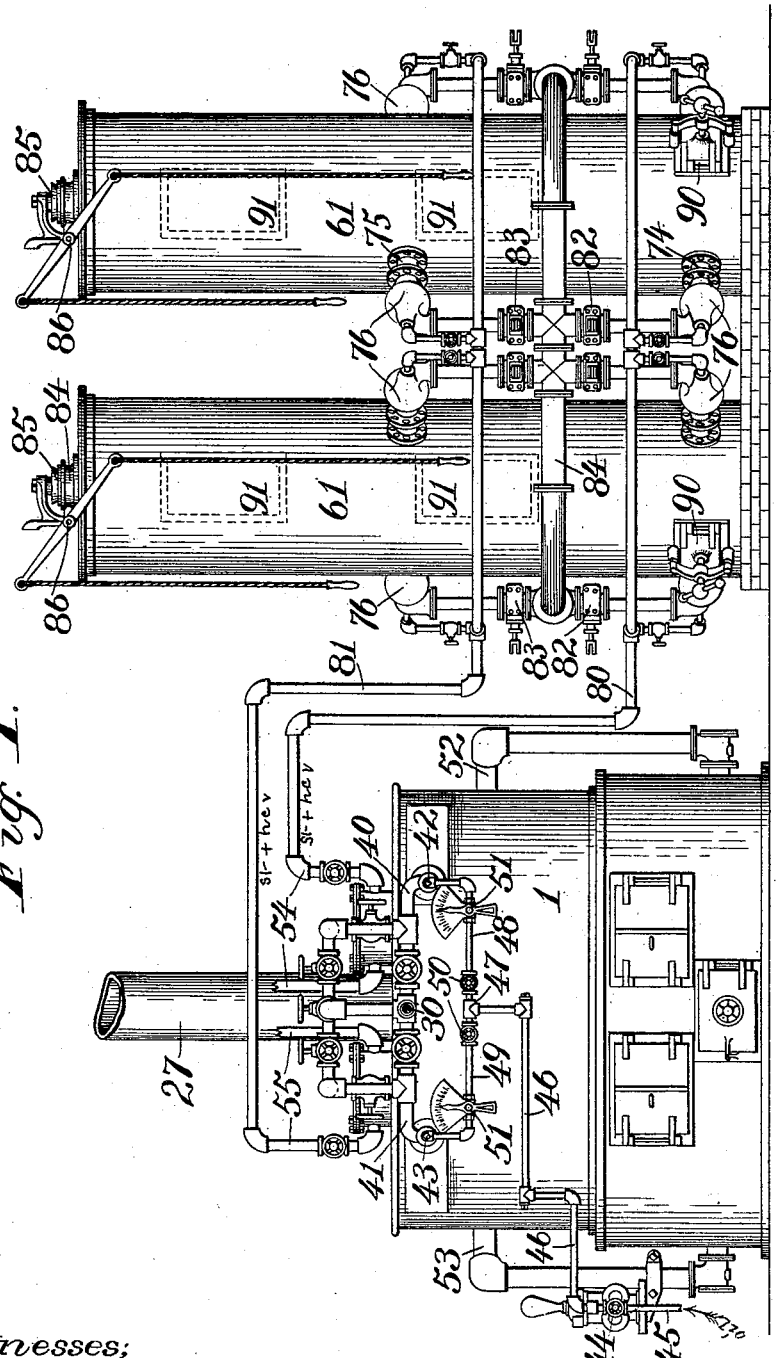
Figure 2:
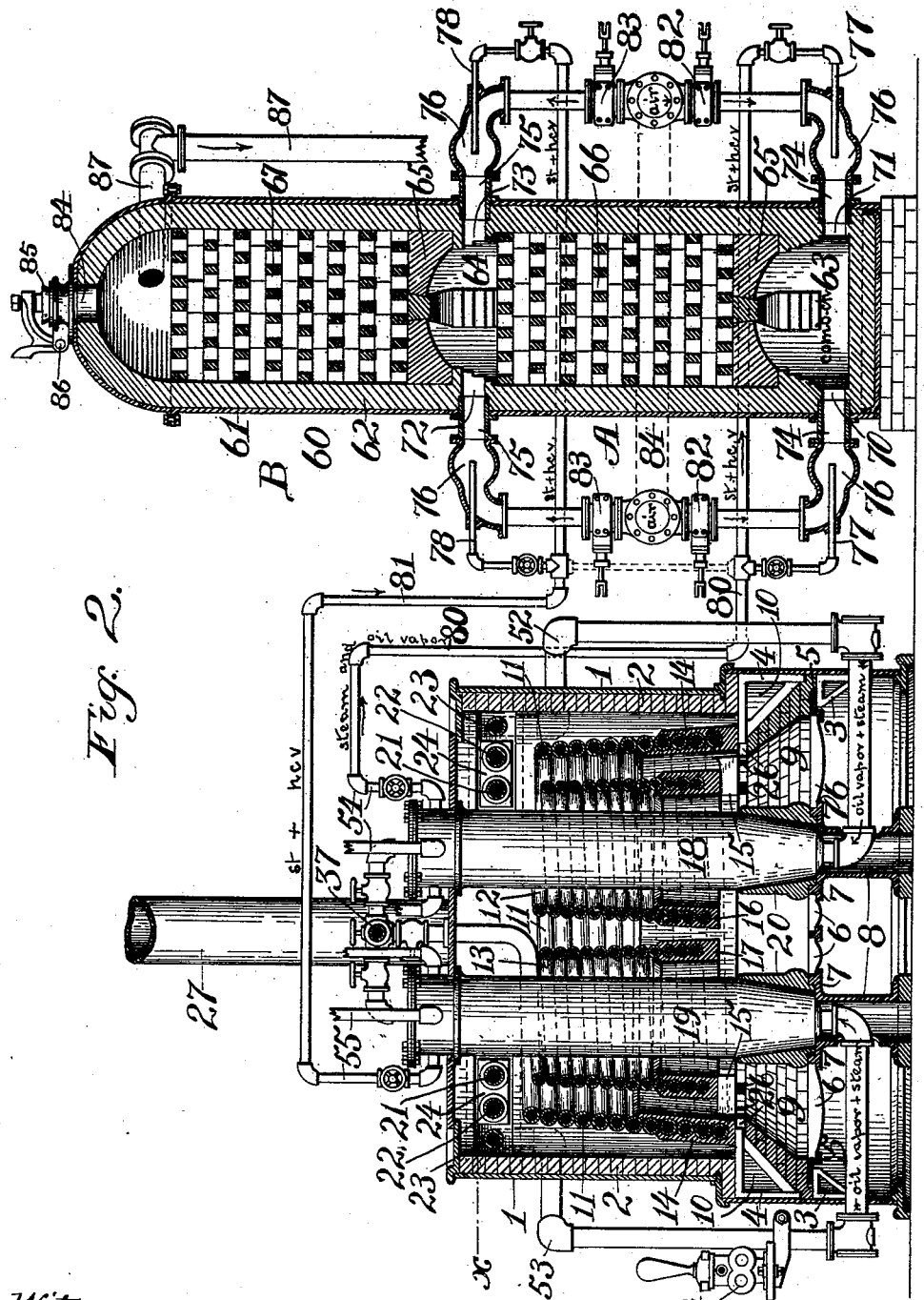
Figure 3:
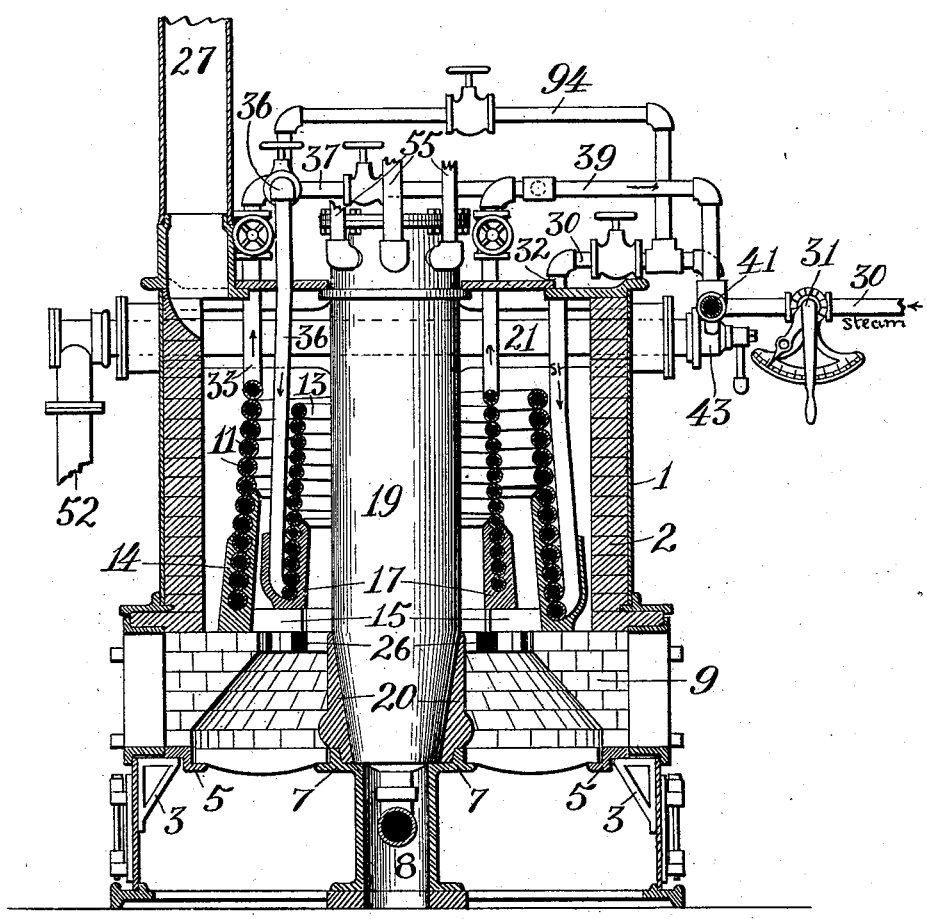

In the accompanying drawings, in which similar numerals and letters refer to similar parts throughout the several views thereof, Figure 1 is a front elevation of the producer and a pair of converters showing the connections from one to the other. Fig. 2 is a vertical sectional view of the producer and one converter, connected together in operative position. Fig. 3 is a vertical sectional view of the producer taken at right angles to that shown in Fig. 2. Fig. 4 is a plan view of the producer showing one end in horizontal section on the line x, x, of Fig. 2. Figs. 5, 6, 7, 8, and 9 represent perspective views of a tile core or support adapted to fit into the corresponding iron shells represented in Figs. 5ª, 6ª, 7ª, 8ª, and 9ª; the two together being adapted to be used in making up the checker-work in the converter; and Fig. 10 represents a brick made of fragments of iron, such as scrap iron, iron filings, &c. held together by and baked into fire clay, adapted for use in the converter.

The producer, in plan view, is oblong, rounded at the ends and consists of an outer metal casing 1, and an inner wall or lining 2 of fire brick. The lower portion of the producer in which is situated the fire box is somewhat larger than the upper part, and on the interior of the metal casing of this lower part, are secured the brackets 3 and 4 which support the fire brick, grate bars, and superheating coils. Upon the lower set of brackets 3, rests a support 5 for one end of the grate bars 6, their opposite ends being supported upon annular rings 7 formed round the upper ends of the hollow supports 8: the wall of fire brick 9 which incloses the fire box, rests upon the brackets 3 and the support 5 and is inwardly inclined as shown, forming an annular fire-box; an air space 10 may be left between the fire-box; and the outer casing if desired. The brackets 4, which support the upper wall of fire-brick, are arranged in the air space 10 and extend inwardly to the fire-box, their inner ends supporting the superheating coils as will be hereinafter described.

The superheating pipes are arranged in three coils, one of which 11, herein called "the outside coil," as it incloses the other two, extends around just inside of the fire-brick wall but out of contact therewith, and its lower coils are inclosed in a casting of iron or steel 14 to protect them from the intense heat of the fire. This casting 14, rests upon the inner ends of the brackets 4, and has a number of lugs 15, extending inwardly from the lower edge thereof to support the inner coils 12 and 13, which latter are formed of smaller pipe than the outside coil; and also have their lower turns protected by metallic castings 16 and 17 which rest upon the said lugs 15. By reference to Fig. 2 it will be seen that one of the inner coils is arranged in each end of the outside coil.

18 and 19 designate two vertical cylindrical retorts passing centrally through the inner coils 12 and 13 respectively, and being supported at their lower ends upon the hollow standards or supports 8. The lower ends of these retorts where they enter the fire box are slightly tapered and inclosed in casings of refractory metal 20 to protect them from the intense heat of the surrounding fire. Within the upper portion of the producer extending transversely across each end thereof above the superheating coils, are three larger pipes 21, 22, and 23, which may be termed horizontal retorts or vaporizers, since it is in these pipes that the oil is vaporized and mixed with the superheated steam from the coils. These vaporizers 21, 22, and 23, are connected in continuous series by means of connecting chambers 24, connecting the pipes 21 and 22 at their rear ends; and the chamber 25 connecting the pipes 22 and 23 at their front ends, so that the steam and oil entering the pipes 21 at their front ends will be caused to pass back and forth through the entire length of the three pipes before passing out at the rear ends of the pipes 23.

In operation the heated products of combustion pass up around the retorts and superheating coils, entering the space outside of the coil 11, through the vents 26 in the brick work, passing upward through the producer and finally out of the smoke stack 27. The steam coming from any suitable boiler enters the pipe 30 which is provided with a hair valve 31, for controlling the quantity of steam admitted, and passing down the pipe 32 enters the lower pipe of the outside coil 11, after circulating upward through this coil which it leaves through the pipe 33 it divides at the cross 34 into the pipes 35 and 36, the valves in the pipe 37 being closed and the valves in the pipes 35 and 36 being turned to allow the desired proportion of steam to pass through each, the steam is now conducted by the pipes 35 and 36 to the lower convolutions of the coils 12 and 13 and passing upward through these coils, it emerges through the pipes 38 and 39 and enters the pipes 40 and 41, which conduct it to the injectors 42 and 43 at the front ends of the vaporizing pipes 21, where it meets the oil.

44 designates an oil pump of any suitable construction by which the oil is pumped from a suitable reservoir through the pipe 45, and forced through the pipes 46 to the "T" coupling 47 where it divides, part passing through the pipe 48 to the injector 42, and part through the pipe 49 to the injector 43; the pipes 48 and 49 are each provided with a cut off valve 50 and a hair valve 51 having a pointer and scale to control and designate the amount of oil fed to each vaporizer. The oil passing through the injectors into the pipes 21 is immediately vaporized by the intense heat and mixes with the superheated steam in the pipe; and this mixture of steam and vapor of oil passes back and forth through the pipes 21, 22, and 23 from the latter of which it enters the pipes 52, and 53 and is conducted thereby to the lower ends of the vertical retorts 18 and 19, which serve as reservoirs in which the vapors receive their final heating, and from which they are fed through a series of pipes 54 and 55 to the converters. The series of pipes 54 and 55 branch out from the upper ends of the vertical retorts 18 and 19, and there may be any number of them to convey vapor to a number of converters at the same time.

The converter 60 as will be seen by reference to Fig. 2 consists of a vertical cylinder 61 lined throughout with a wall 62, of firebrick. A combustion chamber 63 is formed at the bottom of the converter, and a mixing chamber 64 about midway of its height which latter divides the converter into two parts A and B. Above each of the chambers 63 and 64 is secured a spider 65, in the form of an arch, the under sides of which spiders are arched over the said chambers, and each of these spiders 65 supports a checker work of fire-brick and iron as shown at 66 and 67. The said checker-work of fire-brick and iron may be built up of alternate layers of bricks, and blocks or bars of iron, laid so as to leave spaces between them for the passage of the vapor, or it may be built entirely of bricks constructed of fire-clay and bits of iron or iron filings as shown in Fig. 10, or entirely of tiles sheathed in iron as shown in Figs. 5 to 9$^a$, or any other mixture of iron and fire clay as may be found desirable in practice. The surface of the iron is preferably roughened in order to expose a larger surface to the action of the gases, it being understood that a continuous series of spaces is left for the passage of the vapor therethrough.

Four inlet openings, 70, 71, 72, and 73, are formed through the walls of the converter, two of which open into each of the chambers 63 and 64 at diametrically opposite points. Into the two inlet openings 70 and 71, which lead into the lower or combustion chamber 63 are fitted two pipes 74, and into the two openings 72 and 73 which lead into the upper or mixing chamber 64, are fitted two similar pipes 75. All four of the pipes 74 and 75 are provided with enlarged mixing chambers 76 into which enter the pipes 77 and 78,—the pipes 77 which enter the mixing chamber of the lower pipes 74 are connected by suitable pipes (as 80, see Fig. 2) with one of the vertical retorts of the producer, and the pipes 78 which enter the mixing chamber of the upper pipes 75 are similarly connected (as by pipes 81) with the other vertical retort, and these pipes are provided with suitable valves by means of which the vapor from the retorts may be admitted to the converter or shut off at will. The inlet pipes 74 and 75 are connected by pipes having valves 82 and 83 with a large pipe 84 leading from a suitable blower or air reservoir (not shown). The top of the converter may be made flat as shown in Fig. 1 or round as in Fig. 2. A vent opening 84 is formed in the top of the converter, and closed by a valve 85 which is secured to a rock shaft 86, so that the said valve may be opened or closed at will by simply turning the said rock shaft by any suitable means. An outlet pipe 87 for the gas is inserted at the top of the converter and leads to an ordinary drip or cooling chamber, which it is not deemed necessary to show in the drawings.

A door 90, see Fig. 1, is situated at the lower part of the converter and communicates with the interior of the combustion chamber 63 to permit access to the latter for the purpose of igniting the gas when starting to heat up the converter, and other doors (shown in dotted lines at 91) may be made in the walls at suitable points to allow access to the interior for inspection or repairs.

When desirable two or more converters may be connected together as shown in Fig. 1 using one air main to supply all of the air inlet pipes, and the gas pipes 80 and 81 from the retorts may be extended round the converters and connected with all of the gas inlet pipes as shown, thus the two converters can be used alternately as will be hereinafter explained.

The operation of the invention is as follows:—The fire having been started in the producer, the steam is admitted by the valve in the pipe 30 and passes through the superheating coils 11, 12, and 13, as has been hereinbefore described, then to the pipes 21 where it meets the oil from the pump 44; the oil is vaporized as soon as it enters the pipe 21 and the vapor thereof mixes with the steam, the mixture being superheated in the pipes 21, 22, and 23, forms a fuel or heating gas, and finally passes through the pipes 52, and 53, into the retorts 18 and 19. The gas from one of the retorts, say 18, is admitted to the mixing chambers 76 of the pipes 74 where it mixes with the air which is admitted through the valves 82, and passes into the combustion chamber 63 of the converter, where it is ignited. The heat from the burning gas passes through the checker-work parts 66 and 67, of the converter, and makes them very hot, the products of combustion passing off through the vents 84 which at this time are open. When the checker-work is sufficiently hot, the air is turned off, the vent 84 is closed, and the amount of oil entering the retort 18 is greatly reduced by turning the hair valve 51 in the pipe 48, thus forming a mixture in the said retort 18 which is very low in carbon, when this gas enters the chamber 63 and passes through the highly heated checker-work some of the oxygen of the steam seizes the carbon from the oil, and some of the oxygen combines with the highly heated iron in the checker-work, and with any particles of carbon that may be deposited on the checker-work during the previous combustion, and hydrogen is liberated. When the mixed hydrogen and hydro-carbon gases reach the mixing chamber 64, they meet a mixture of gas from the other retort 19, which is much higher in carbon, and these gases unite to form an illuminating gas which passes off through the pipe 87. Moreover the passage of the gas over the iron reduces the sulphides and phosphides of hydrogen to ferrous sulphides and phosphides, and so purifies the gas and removes the offensive odor of those ingredients. The gas is fixed in its passage by the high heat of the checker-work, and it may be afterward cooled and scrubbed in the ordinary way. Should it be desired to increase or decrease the amount of carbon in the fixed gas, the valves on the pipes 78 may be opened wider or partially or wholly closed.

It will be seen that the steam and oil gases low in carbon enter at the bottom of the converter and before they reach the chamber 64, the iron surfaces have taken up much of the oxygen leaving mainly free hydrogen and hydrocarbon gases with some carbonic oxide; this mixture of gases burns with a bluish dim, but very hot flame, and is useful as a heating gas but almost useless as an illuminating gas; and if the pipes 78 be closed this heating gas rises through the upper half of the converter and goes off through the pipe 87; but to make illuminating gas a further supply of carbon must be added and this is done by injecting a mixture of gases richer in carbon, through the pipe 78, as already described. When the checker-work of the converter becomes too cool to fix the gas, the fuel gas and air are again admitted to the combustion chamber 63, and ignited; and the process of heating up is repeated; thus the processes of heating up and of forming gas are carried on alternately in the converter.

In the apparatus shown in Fig. 1, the two converters may be used alternately, that is, while one is heating up the other may be producing gas, and vice versa, the arrangement of valves being such that gas or air may be admitted to or shut off from either converter without affecting the other. This alternate heating up the converter by internal combustion, and cooling down by the gases to be fixed, has an important effect upon the efficiency and the endurance of the iron bars or shells used in the checker work; for when the temperature in that converter is being lowered by the superheated steam and oil passing through, the iron is rapidly oxidized, setting free hydrogen and forming iron oxides; now when the converter is heated up again by internal combustion the heat and the carbonic-oxide present drive or carry off some of the oxygen from the iron and leave it in a condition to absorb oxygen when the steam and oil are once more admitted.

In the case of accident to some of the parts of the producer, I have provided a number of "cut out" pipes so that although some of the pipes or coils may be disabled, the producer may still be run until a convenient time for repairs. To this end the pipe 37 is provided which is connected at one end with the cross coupling 34, and at the other end by a "T" coupling with the pipes 92 and 93, which are in turn connected with the pipes 38 and 39, these pipes are all supplied with valves as shown in Fig. 4, so that by closing the valves in the pipes 35 and 38 and opening those in the pipes 37 and 92, the steam will pass through the latter pipes to the pipe 38 without passing into the coil 12. In like manner the coil 13 may be "cut out" by closing the valves in the pipes 36 and 39, and opening those in the pipes 37 and 38, the steam will then pass through the two latter pipes instead of the coil 13. When it is desired to "cut out" the outside coil 11, the pipe 94 is used, which connects the pipe 30 with the cross 34, in this instance the valves in the pipes 30 and 33 are closed, and that in the pipe 94 opened when the steam will pass through the latter to the inner coils 12 and 13 without entering the outside coil 11.

Having thus described my invention, what I claim and desire to secure by Letters-Patent of the United States, is:—

The process for the manufacture of illuminating gas from oil and steam, which consists in passing a highly heated mixture of the steam and oil gases low in carbon over highly heated iron surfaces; then injecting into the gas thus formed a highly heated mixture of the steam and oil gases richer in carbon and also passing this mixture over highly heated iron surfaces, substantially as described.

In testimony whereof I affix my signature in presence of two witnesses.

JOHN B. ARCHER.

Witnesses:
JOHN C. WILSON,
PERCY C. BOWEN.